United States Patent
Wang et al.

(10) Patent No.: US 12,233,631 B2
(45) Date of Patent: Feb. 25, 2025

(54) METHODS AND APPARATUS TO COUPLE A DECORATIVE COMPOSITE HAVING A REINFORCING LAYER TO A PANEL

(71) Applicant: The Boeing Company, Chicago, IL (US)

(72) Inventors: Xiaoxi Wang, Mukilteo, WA (US); John Wilde, Mill Creek, WA (US); Jason Drexler, Brier, WA (US)

(73) Assignee: The Boeing Company, Arlington, VA (US)

( * ) Notice: Subject to any disclaimer, the term of this patent is extended or adjusted under 35 U.S.C. 154(b) by 633 days.

(21) Appl. No.: 16/687,249

(22) Filed: Nov. 18, 2019

(65) Prior Publication Data

US 2020/0086621 A1 Mar. 19, 2020

Related U.S. Application Data

(63) Continuation of application No. 15/153,283, filed on May 12, 2016, now Pat. No. 10,525,685.

(51) Int. Cl.
```
B32B 7/12      (2006.01)
B32B 5/02      (2006.01)
B32B 5/10      (2006.01)
B32B 5/18      (2006.01)
B32B 27/06     (2006.01)
B32B 27/08     (2006.01)
B32B 27/12     (2006.01)
B32B 27/30     (2006.01)
B32B 37/12     (2006.01)
B32B 37/14     (2006.01)
```

(52) U.S. Cl.
CPC .............. *B32B 37/12* (2013.01); *B32B 5/02* (2013.01); *B32B 5/022* (2013.01); *B32B 5/10* (2013.01); *B32B 5/18* (2013.01); *B32B 7/12* (2013.01); *B32B 27/065* (2013.01); *B32B 27/08* (2013.01); *B32B 27/12* (2013.01); *B32B 27/304* (2013.01); *B32B 37/142* (2013.01); *B32B 2250/02* (2013.01); *B32B 2250/03* (2013.01); *B32B 2255/10* (2013.01); *B32B 2255/205* (2013.01); *B32B 2260/021* (2013.01); *B32B 2260/046* (2013.01); *B32B 2307/10* (2013.01); *B32B 2307/3065* (2013.01); *B32B 2307/402* (2013.01); *B32B 2307/50* (2013.01); *B32B 2307/724* (2013.01); *B32B 2327/12* (2013.01); *B32B 2451/00* (2013.01); *B32B 2605/00* (2013.01); *B32B 2605/18* (2013.01); *B32B 2607/00* (2013.01)

(58) Field of Classification Search
None
See application file for complete search history.

(56) References Cited

U.S. PATENT DOCUMENTS

| | | | |
|---|---|---|---|
| 2,268,477 A | 12/1941 | Elmendorf | |
| 2,664,833 A | 1/1954 | Armstrong et al. | |
| 3,418,189 A | 12/1968 | Grosheim | |
| 3,434,411 A | 3/1969 | Allen et al. | |
| 4,219,376 A | 8/1980 | Roman | |
| 4,238,437 A | 12/1980 | Rolston | |
| 4,308,304 A * | 12/1981 | Cochran, II | H05F 3/025 428/95 |
| 4,350,545 A | 9/1982 | Garabedian | |
| 4,367,110 A | 1/1983 | Yoshikawa | |
| 4,489,119 A | 12/1984 | Ishige et al. | |
| 4,504,205 A | 3/1985 | Stofko | |
| 4,598,007 A | 7/1986 | Kourtides et al. | |
| 4,599,127 A | 7/1986 | Cannady, Jr. et al. | |
| 4,693,926 A | 9/1987 | Kowalski et al. | |
| 4,759,964 A | 7/1988 | Fischer | |
| 4,803,108 A | 2/1989 | Leuchten et al. | |
| 4,855,182 A | 8/1989 | Ondrejas | |
| 5,037,350 A | 8/1991 | Richardson et al. | |
| 5,085,921 A | 2/1992 | Jayarajan | |
| 5,137,775 A | 8/1992 | Davis | |
| 5,589,016 A | 12/1996 | Hoopingarner et al. | |
| 5,624,728 A | 4/1997 | Hoopingarner et al. | |
| 5,698,153 A | 12/1997 | Hoopingarner et al. | |
| 5,806,796 A | 9/1998 | Healey | |
| 5,976,671 A | 11/1999 | Gleim | |
| 6,066,385 A | 5/2000 | Kim | |
| 6,251,497 B1 | 6/2001 | Hoopingarner et al. | |

(Continued)

FOREIGN PATENT DOCUMENTS

| CH | 498714 | 11/1970 |
|---|---|---|
| CN | 202115040 | 1/2012 |

(Continued)

OTHER PUBLICATIONS

Japan Patent Office, "Decision of Rejection", issued in connection with Japanese Patent Application No. 2017-087245 on Oct. 5, 2021, 6 pages. (English Translation Included).

European Patent Office, "Communication pursuant to Article 94(3) EPC," issued on connection with European Patent Application No. 18 202 385.3, dated Oct. 9, 2020, 5 pages.

European Patent Office, "Extended European Search Report," issued in connection with European Patent Application No. 18202385.3, dated Jan. 24, 2019, 10 pages.

United States Patent and Trademark Office, "Final Office Action," issued in connection with U.S. Appl. No. 15/153,324, filed Aug. 20, 2019,13 pages.

(Continued)

*Primary Examiner* — Anish P Desai

(74) *Attorney, Agent, or Firm* — Hanley, Flight & Zimmerman, LLC

(57) ABSTRACT

Methods and apparatus to couple a decorative composite having a reinforcing layer to a panel are disclosed. An example apparatus includes a decorative layer to couple to a panel. The decorative layer including a first tile, a second tile, and an adhesive liner positioned between the first tile and the second tile to couple respective edges of first and second tiles.

21 Claims, 6 Drawing Sheets

(56) References Cited

U.S. PATENT DOCUMENTS

| | | |
|---|---|---|
| 6,340,413 B1 | 1/2002 | Nilsson et al. |
| 6,348,117 B1 * | 2/2002 | Tribo .................. B29C 41/28 |
| | | 264/294 |
| 6,419,776 B1 | 7/2002 | Hoopingarner et al. |
| 6,592,179 B1 | 7/2003 | Miyazaki |
| 6,656,567 B1 | 12/2003 | Abe et al. |
| 6,726,971 B1 | 4/2004 | Wong |
| 7,063,119 B1 | 6/2006 | Kim |
| 7,289,906 B2 | 10/2007 | van der Merwe et al. |
| 8,091,708 B2 | 1/2012 | Loftin |
| 8,097,108 B2 | 1/2012 | Wilde et al. |
| 8,555,946 B2 | 10/2013 | Luo |
| 8,715,824 B2 | 5/2014 | Rawlings et al. |
| 9,031,782 B1 | 5/2015 | Lemay et al. |
| 9,855,721 B2 | 1/2018 | Drexler et al. |
| 10,173,394 B2 | 1/2019 | Wang et al. |
| 10,525,685 B2 | 1/2020 | Wang |
| 10,647,099 B2 | 5/2020 | Wang |
| 10,661,530 B2 | 5/2020 | Wilde |
| 10,751,982 B2 | 8/2020 | Wang |
| 2002/0084975 A1 | 7/2002 | Lin |
| 2002/0160680 A1 | 10/2002 | Laurence et al. |
| 2002/0182957 A1 | 12/2002 | Levenda |
| 2003/0033779 A1 | 2/2003 | Downey |
| 2003/0077423 A1 | 4/2003 | Flanigan et al. |
| 2003/0165651 A1 * | 9/2003 | Sieber .................. C09J 7/20 |
| | | 428/40.1 |
| 2003/0190458 A1 | 10/2003 | Spiewak et al. |
| 2003/0219578 A1 | 11/2003 | Jones et al. |
| 2004/0146696 A1 | 7/2004 | Jones |
| 2004/0192137 A1 | 9/2004 | Starkey et al. |
| 2004/0209038 A1 * | 10/2004 | Foxon .................. E01C 13/08 |
| | | 428/86 |
| 2004/0253414 A1 | 12/2004 | Longobardi |
| 2005/0025929 A1 | 2/2005 | Smith |
| 2005/0050782 A1 | 3/2005 | Ryan et al. |
| 2005/0052516 A1 | 3/2005 | Wilde et al. |
| 2005/0088014 A1 | 4/2005 | Woodson et al. |
| 2005/0153023 A1 | 7/2005 | Overton |
| 2005/0255311 A1 | 11/2005 | Formella |
| 2006/0089073 A1 | 4/2006 | Sobieski |
| 2006/0151857 A1 | 7/2006 | Gasparoni |
| 2006/0166002 A1 * | 7/2006 | Grey .................. C09D 163/00 |
| | | 523/400 |
| 2006/0234010 A1 | 10/2006 | Wirrick et al. |
| 2006/0240217 A1 * | 10/2006 | Foss .................. B32B 33/00 |
| | | 428/920 |
| 2006/0246796 A1 | 11/2006 | Duffy |
| 2006/0277807 A1 | 12/2006 | Wilde et al. |
| 2007/0031645 A1 | 2/2007 | Wilde |
| 2007/0148410 A1 | 6/2007 | Wimer et al. |
| 2007/0218269 A1 | 9/2007 | Kato et al. |
| 2008/0087376 A1 | 4/2008 | Kitchin et al. |
| 2008/0145600 A1 | 6/2008 | Hendren et al. |
| 2008/0193695 A1 | 8/2008 | Kato et al. |
| 2008/0237909 A1 | 10/2008 | Bech |
| 2009/0057947 A1 | 3/2009 | Nemchick et al. |
| 2010/0043939 A1 | 2/2010 | Heinimann et al. |
| 2010/0139839 A1 | 6/2010 | Ridgard et al. |
| 2010/0215907 A1 | 8/2010 | Spires |
| 2011/0014419 A1 | 1/2011 | Simmons et al. |
| 2011/0042000 A1 | 2/2011 | Wilde et al. |
| 2011/0250434 A1 | 10/2011 | Schauer et al. |
| 2012/0045638 A1 | 2/2012 | Waldman et al. |
| 2013/0022780 A1 | 1/2013 | Kawazoe et al. |
| 2014/0120303 A1 | 5/2014 | Wilde et al. |
| 2014/0209231 A1 | 7/2014 | Schappert |
| 2015/0092028 A1 | 4/2015 | Yang et al. |
| 2015/0203213 A1 | 7/2015 | Levien et al. |
| 2015/0239200 A1 | 8/2015 | Bartolome |
| 2016/0024708 A1 * | 1/2016 | McGill .................. B32B 5/26 |
| | | 428/95 |
| 2016/0047675 A1 | 2/2016 | Tanenhaus et al. |
| 2016/0089851 A1 | 3/2016 | Drexler et al. |
| 2016/0151992 A1 | 6/2016 | Wilde |
| 2016/0236780 A1 | 8/2016 | Staudigel |
| 2016/0250828 A1 | 9/2016 | Wilde et al. |
| 2017/0326836 A1 | 11/2017 | Wilde et al. |
| 2017/0326837 A1 | 11/2017 | Wang et al. |
| 2017/0326845 A1 | 11/2017 | Benham et al. |
| 2017/0326858 A1 | 11/2017 | Wang |
| 2017/0326859 A1 | 11/2017 | Wang et al. |
| 2017/0326863 A1 | 11/2017 | Wang et al. |
| 2018/0201810 A1 | 7/2018 | Shido et al. |
| 2020/0086621 A1 | 3/2020 | Wang |
| 2020/0160065 A1 | 5/2020 | Weinzaepfel |

FOREIGN PATENT DOCUMENTS

| | | |
|---|---|---|
| DE | 19640263 | 4/1998 |
| DE | 102006054586 | 1/2008 |
| EP | 0662492 A1 | 7/1995 |
| EP | 1013414 | 6/2000 |
| EP | 1600288 | 11/2005 |
| EP | 2085212 | 8/2009 |
| EP | 2085212 A1 | 8/2009 |
| EP | 3000593 | 3/2016 |
| EP | 3061601 | 8/2016 |
| GB | 2174033 | 10/1986 |
| GB | 2228214 | 8/1990 |
| GB | 2491190 | 11/2012 |
| JP | 5124673 U | 2/1976 |
| JP | 51024673 U | 2/1976 |
| JP | 6342850 A | 2/1988 |
| JP | 63042850 A | 2/1988 |
| JP | 02088331 | 3/1990 |
| JP | 2088331 A | 3/1990 |
| JP | 08169775 A | 7/1996 |
| JP | 10030287 | 2/1998 |
| JP | 10030287 A | 3/1998 |
| JP | 2000265589 | 9/2000 |
| JP | 2002138375 | 5/2002 |
| JP | 2004060061 | 2/2004 |
| JP | 2005075953 | 3/2005 |
| JP | 2005219504 | 8/2005 |
| JP | 2007083721 | 4/2007 |
| JP | 2008037060 | 2/2008 |
| JP | 2009538250 | 11/2009 |
| JP | 2011021094 | 2/2011 |
| JP | 2011206998 | 10/2011 |
| JP | 2015138203 | 7/2015 |
| JP | 2016133317 | 7/2016 |
| JP | 2017019272 | 1/2017 |
| JP | 6342850 B2 | 6/2018 |
| KR | 20110026567 | 3/2011 |
| KR | 20110026567 A1 | 3/2011 |
| WO | 2005037518 | 4/2005 |

OTHER PUBLICATIONS

United States Patent and Trademark Office, "Non-Final Office Action," issued in connection with U.S. Appl. No. 15/153,338, filed Aug. 27, 2018, 13 pages.

United States Patent and Trademark Office, "Notice of Allowance and Fee(s) Due," issued in connection with U.S. Appl. No. 15/592,001, filed Sep. 27, 2019, 7 pages.

United States Patent and Trademark Office, "Non-Final Office Action," issued in connection with U.S. Appl. No. 15/153,252, filed Sep. 13, 2019, 35 pages.

United States Patent and Trademark Office, "Final Office Action," issued in connection with U.S. Appl. No. 15/153,324, filed Nov. 20, 2018, 13 pages.

United States Patent and Trademark Office, "Requirement for Restriction and/or Election," issued in connection with U.S. Appl. No. 15/153,324, filed Mar. 28, 2018, 5 pages.

United States Patent and Trademark Office, "Advisory Action," issued in connection with U.S. Appl. No. 15/153,324, filed Feb. 7, 2019, 3 pages.

United States Patent and Trademark Office, "Notice of Allowance and Fee(s) Due," issued in connection with U.S. Appl. No. 15/153,297, filed Jul. 24, 2018, 11 pages.

(56) References Cited

OTHER PUBLICATIONS

3M, "200MP Micro-channel Laminating Adhesives. 467MC, 468MC, 467MCF and 468MCF", accessed at [http://kleylenta.ru/download/lenta/467mc.pdf] on Jun. 1, 2016, 3 pages.

Weinig, "Weinig Unimat 500: The All-Round Machine for Greater Flexibility in Profiling," retrieved from <https://web.archi ve.org/web/20160207205725/https://www.weinig.com/en/solid-wood/planing-machines-and-moulders/unimat-series/unimat-500.html> on Sep. 29, 2017, 3 pages.

Zhang et al., "Roll Manufacturing of Polymer Microfluidic Devices Using a Roll Embossing Process," Sensors and Actuators A, 230 (2015), pp. 156-169, 14 pages.

European Patent Office, "Partial European Search Report," issued in connection with European Patent Application No. 17163795.2, dated Oct. 18, 2017, 13 pages.

European Patent Office, "Extended European Search Report," issued in connection with European Patent Application No. 17163795.2, dated Mar. 2, 2018, 14 pages.

European Patent Office, "Extended European Search Report," issued in connection with European Patent Application No. 17163790.3, dated Oct. 17, 2017, 7 pages.

European Patent Office, "Extended European Search Report," issued in connection with European Patent Application No. 17163791.1, dated Oct. 12, 2017, 11 pages.

European Patent Office, "Extended European Search Report," issued in connection with European Patent Application No. 17163792.9, dated Oct. 17, 2017, 10 pages.

European Patent Office, "Extended European Search Report," issued in connection with European Patent Application No. 17163793.7, dated Oct. 16, 2017, 7 pages.

United States Patent and Trademark Office, "Final Office Action," issued in connection with U.S. Appl. No. 15/153,338, filed Jan. 31, 2019, 5 pages.

United States Patent and Trademark Office, "Non-Final Office Action," issued in connection with U.S. Appl. No. 15/153,252, filed May 31, 2018, 18 pages.

United States Patent and Trademark Office, "Final Office Action," issued in connection with U.S. Appl. No. 15/153,252, filed Feb. 27, 2019, 15 pages.

United States Patent and Trademark Office, "Non-Final Office Action," issued in connection with U.S. Appl. No. 15/153,324, filed Mar. 7, 2019, 11 pages.

European Patent Office, "Communication pursuant to Article 94(3) EPC," issued in connection with European Patent Application No. 17 163 791.1, dated Oct. 16, 2019, 4 pages.

United States Patent and Trademark Office, "Final Office Action," issued in connection with U.S. Appl. No. 15/153,266, filed Aug. 1, 2019, 23 pages.

United States Patent and Trademark Office, "Requirement for Restriction and/or Election," issued in connection with U.S. Appl. No. 15/153,266, filed Jun. 28, 2018, 7 pages.

United States Patent and Trademark Office, "Requirement for Restriction and/or Election," issued in connection with U.S. Appl. No. 15/153,283, filed Jul. 12, 2018, 8 pages.

United States Patent and Trademark Office, "Notice of Allowance and Fee(s) Due," issued in connection with U.S. Appl. No. 15/153,283, filed Aug. 19, 2019, 11 pages.

United States Patent and Trademark Office, "Requirement for Restriction and/or Election," issued in connection with U.S. Appl. No. 15/153,338, filed Apr. 30, 2018, 5 pages.

United States Patent and Trademark Office, "Non-Final Office Action," issued in connection with U.S. Appl. No. 15/153,324, filed Jun. 14, 2018, 12 pages.

European Patent Office, "Extended European Search Report," issued in connection with European Patent Application No. 19196880.9, dated Dec. 3, 2019, 7 pages.

European Patent Office, "Communication pursuant to Article 94(3)," issued in connection with European Patent Application No. 17163792.9, dated Nov. 14, 2019, 7 pages.

United States Patent and Trademark Office, "Notice of Allowance and Fee(s) Due," issued in connection with U.S. Appl. No. 15/153,324, dated Dec. 31, 2019, 13 pages.

United States Patent and Trademark Office, "Notice of Allowance and Fee(s) Due," issued in connection with U.S. Appl. No. 15/153,266, dated Dec. 31, 2019, 14 pages.

European Patent Office, "Communication pursuant to Article 94(3)," issued in connection with European Patent Application No. 18202385.3, dated Oct. 11, 2019, 4 pages.

United States Patent and Trademark Office, "Final Office Action," issued in connection with U.S. Appl. No. 15/153,252, filed Jan. 29, 2020, 46 pages.

United States Patent and Trademark Office, "Notice of Allowance and Fee(s) Due," dated Apr. 13, 2020, issued in connection with U.S. Appl. No. 15/153,338, 10 pages.

European Patent Office, "Communication pursuant to Article 94(3) EPC," issued on connection with European Patent Application No. 18 202 385.3, dated Mar. 25, 2020, 6 pages.

Japan Patent Office, "Notice of Reasons for Rejection" issued in connection with Japanese Patent Application No. 2017-087224, dated Mar. 2, 2021, 6 pages.

Japan Patent Office, "Notice of Reasons for Rejection" issued in connection with Japanese Patent Application No. 2017-087233, dated Feb. 24, 2021, 10 pages.

European Patent Office, "Extended European Search Report," issued in connection with European Patent Application No. 20173192.4, dated Aug. 20, 2020, 10 pages.

European Patent Office, "Communication pursuant to Article 94(3) EPC," issued in connection with European Patent Application No. 17 163 792.9, dated Aug. 17, 2020, 7 pages.

United States Patent and Trademark Office, "Non-Final Office Action," issued in connection with U.S. Appl. No. 16/837,498, dated Jul. 9, 2020, 14 pages.

United States Patent and Trademark Office, "Notice of Allowance and Fee(s) Due," issued in connection with U.S. Appl. No. 16/837,498, dated Nov. 4, 2020, 8 pages.

Japan Patent Office, "Notice of Reasons for Rejection" issued in connection with Japanese Patent Application No. 2017-087245, dated Mar. 30, 2021, 6 pages.

United States Patent and Trademark Office, "Notice of Allowance and Fee(s) Due," issued in connection with U.S. Appl. No. 15/153,252, dated Feb. 3, 2021, 12 pages.

United States Patent and Trademark Office, "Final Office Action," issued in connection with U.S. Appl. No. 15/153,252, dated Oct. 19, 2020, 18 pages.

United States Patent and Trademark Office, "Final Office Action," issued in connection with U.S. Appl. No. 15/153,252, dated Jun. 2, 2020, 20 pages.

United States Patent and Trademark Office, "Non-Final Office Action," issued in connection with U.S. Appl. No. 15/153,297, filed Mar. 13, 2018, 16 pages.

European Patent Office, "Extended Search Report," issued in connection with European Patent Application No. 17163793.7, issued on Oct. 16, 2017, 7 pages.

United States Patent and Trademark Office, "Non-Final Office Action," issued in connection with U.S. Appl. No. 15/153,266, filed Nov. 2, 2018, 20 pages.

United States Patent and Trademark Office, "Non-Final Office Action," issued in connection with U.S. Appl. No. 15/153,283, filed Nov. 9, 2018, 20 pages.

United States Patent and Trademark Office, "Restriction Requirement," issued in connection with U.S. Appl. No. 15/153,283, filed Jul. 12, 2018, 8 pages.

United States Patent and Trademark Office, "Final Office action," issued in connection with U.S. Appl. No. 15/153,283, filed Apr. 29, 2019, 21 pages.

United States Patent and Trademark Office, Final Office Action, issued in connection with U.S. Appl. No. 15/153,266, filed May 2, 2019, 22 pages.

United States Patent and Trademark Office, "Non-Final Office Action," issued in connection with U.S. Appl. No. 15/153,338, filed Jun. 13, 2019, 12 pages.

(56) References Cited

OTHER PUBLICATIONS

United States Patent and Trademark Office, "Non-Final Office Action," issued in connection with U.S. Appl. No. 15/153,266, filed Aug. 1, 2019, 23 pages.

United States Patent and Trademark Office, "Advisory Action," issued in connection with U.S. Appl. No. 15/153,324, filed Nov. 5, 2019, 2 pages.

United States Patent and Trademark Office, "Final Office Action," issued in connection with U.S. Appl. No. 15/153,338, filed Nov. 22, 2019, 13 pages.

United States Patent and Trademark Office, "Notice of Allowance," issued in connection with U.S. Appl. No. 15/153,324, filed Dec. 31, 2019, 10 pages.

United States Patent and Trademark Office, "Corrected Notice of Allowability," issued in connection with U.S. Appl. No. 15/153,266, filed Apr. 27, 2020, 11 pages.

European Patent Office, "Communication pursuant to Article 94(3) EPC," issued in connection with European Patent Application No. 19196880.9, dated Sep. 11, 2020, 5 pages.

Japan Patent Office, "Notice of Reasons for Rejection" issued in connection with Japanese Patent Application No. 2017-087245, dated Mar. 30, 2021, 6 pages. Mar. 17, 2021.

European Patent Office, "Communication under Rule 71(3) EPC," issued in connection with European Patent Application No. 19196880.9, dated Sep. 17, 2021, 7 pages.

Japan Patent Office, "Decision of Rejection" issued in connection with Japanese Patent Application No. 2017-087224, dated Aug. 17, 2021, 6 pages.

Definition "coil/coiling", Merriam-Webster dictionary, retrieved on Nov. 3, 2018 (Year: 2018).

Japan Patent Office, "Notice of Reasons for Rejection", issued in connection with Japanese Application No. 2017-87245, Feb. 14, 2023, 6 pages (English Translation Included).

United States Patent and Trademark Office, "Requirement for Restriction and/or Election," issued in connection with U.S. Appl. No. 17/405,831, dated Feb. 9, 2023, 7 pages.

Polyvinyl Fluoride—PVF, Jul. 12, 2011, Azom.com (Year:2011).

Adhesive and Lamination Guide for Tedlar PVF Film, Apr. 21, 2015 (Year: 2015).

European Patent Office, "Communication pursuant to Article 94(3) EPC," issued in connection with European Patent Application No. 18 202 385.3, dated Mar. 25, 2020, 6 pages.

United States Patent and Trademark Office, "Advisory Action," issued in connection with U.S. Appl. No. 15/153,338, dated Mar. 16, 2020, 3 pages.

United States Patent and Trademark Office, "Notice of Allowance and Fee(s) Due," issued in connection with U.S. Appl. No. 16/837,498, dated Dec. 15, 2020, 2 pages.

United States Patent and Trademark Office, "Notice of Allowance" issued in U.S. Appl. No. 15/153,252 on Feb. 3, 2021 (12 pages).

United States Patent and Trademark Office, "Notice of Allowance" issued in U.S. Appl. No. 15/153,252, on May 24, 2021 (8 pages).

United States Patent and Trademark Office, "Non-Final Office Action", issued in connection with U.S. Appl. No. 17/405,831, Mar. 14, 2023, 15 pages.

United States Patent and Trademark Office, "Final Office Action", issued in connection with U.S. Appl. No. 17/405,831, dated Aug. 10, 2023, 19 pages.

United States Patent and Trademark Office, "Extended European Search Report", issued in connection with European Patent Application No. 23195113.8 on Sep. 28, 2023, 6 pages.

United States Patent and Trademark Office, "Advisory Action," issued in connection with U.S. Appl. No. 17/40,831, dated Oct. 12, 2023, 5 pages.

United States Patent and Trademark Office, "Final Office Action," issued in connection with U.S. Appl. No. 17/405,831, dated May 21, 2024, 33 pages.

United States Patent and Trademark Office, "Non-Final Office Action," issued in connection with U.S. Appl. No. 17/405,831, dated Nov. 6, 2024, 25 pages.

Japan Patent Office, "Notice of Reasons for Rejection," issued in connection with Japanese Application No. 2023-096797, Sep. 30, 2024, 6 pages (English Translation Included).

United States Patent and Trademark Office, "Advisory Action," issued in connection with U.S. Appl. No. 17/405,831, dated Aug. 5, 2024, 15 pages.

\* cited by examiner

METHODS AND APPARATUS TO COUPLE A DECORATIVE COMPOSITE HAVING A REINFORCING LAYER TO A PANEL

CROSS-REFERENCE TO RELATED APPLICATIONS

This patent arises as a continuation of U.S. patent application Ser. No. 15/153,283 filed on May 12, 2016, entitled "Methods and apparatus to couple a decorative composite having a reinforcing layer to a panel, which is hereby incorporated herein by reference in its entirety.

Additionally, this patent relates to subject matter disclosed in a U.S. patent application entitled "Methods and Apparatus to Couple a Decorative Layer to a Core Layer of a Panel via a Barrier Layer", a U.S. patent application entitled "Methods and Apparatus to Couple a Decorative Layer to a Panel via a High-Bond Adhesive Layer", a U.S. patent application entitled "Methods and Apparatus to Vent Gas and Vapor from a Panel via Venting Channels for a Decorative Layer", a U.S. patent application entitled "Methods and Apparatus to Form Venting Channels on a Panel for a Decorative Layer", a U.S. patent application entitled "Methods and Apparatus to Remove Gas and Vapor from a Panel for a Decorative Layer", all of which were filed on May 12, 2016 and are incorporated herein by reference in their entireties.

FIELD OF THE DISCLOSURE

This patent relates generally to decorative layers and, more particularly, to methods and apparatus to couple a decorative composite having a reinforcing layer to a panel.

BACKGROUND

Vehicles (e.g., aircraft, buses, trains, tractor-trailers, ships, etc.), buildings and/or other structures (e.g., billboards) include surfaces that are visible to the public. Oftentimes, these surfaces include decorative images for aesthetic, identification and/or advertising purposes. For example, some surfaces of aircraft include decorative images that identify an airline carrier associated with the aircraft. In some instances, the decorative images are formed on a decorative laminate that is coupled to the surface of the vehicle, building and/or other structure. A pocket of gas and/or vapor (e.g., water vapor) may form between the decorative laminate and the surface, thereby causing an adjacent portion of the decorative laminate to bubble.

SUMMARY

In one example, an apparatus includes a decorative layer and a first reinforcing layer coupled to the decorative layer. The first reinforcing layer has a rigidity. The example apparatus includes a coil reduction layer coupled to the first reinforcing layer that is coupled to the decorative layer. The coil reduction layer is to apply a first force to the first reinforcing layer to counteract an opposing second force applied by the decorative layer to reduce coiling of the first reinforcing layer. The example apparatus includes an adhesive layer applied to the coil reduction layer that is coupled to the first reinforcing layer to enable the decorative layer to be coupled to a panel. The rigidity of the first reinforcing layer to enable the first reinforcing layer to distribute a force exerted by at least one of gas or vapor disposed between the first reinforcing layer and the decorative layer to impede separation of a portion of the decorative layer from the panel.

In another example, an apparatus includes means for decorating a panel, means for reinforcing coupled to the means for decorating, and means for reducing coiling of the means for reinforcing. The means for reducing coiling is coupled to the means for reinforcing that is coupled to the means for decorating. The means for reducing coiling is to apply a first force to the means for reinforcing to counteract an opposing second force applied by the means for decorating to reduce coiling of the means for reinforcing. The example apparatus includes means for coupling applied to the means for reducing coiling that is coupled to the means for reinforcing to enable the means for decorating to be coupled to a panel. The means for reinforcing having a rigidity that enables the means for reinforcing to distribute a force exerted by at least one of gas or vapor disposed between the means for reinforcing and the means for decorating to impede separation of a portion of the means for decorating from the panel.

In another example, a method includes coupling a first reinforcing layer to a decorative layer. The first reinforcing layer has a rigidity. The example method includes coupling a coil reduction layer to the first reinforcing layer that is coupled to the decorative layer. The coil reduction layer is to apply a first force to the first reinforcing layer to counteract an opposing second force applied by the decorative layer to reduce coiling of the first reinforcing layer. The example method includes applying an adhesive layer to the coil reduction layer that is coupled to the first reinforcing layer to enable the decorative layer to be coupled to a panel. The rigidity of the first reinforcing layer is to enable the first reinforcing layer to distribute a force exerted by at least one of gas or vapor disposed between the first reinforcing layer and the decorative layer to impede separation of a portion of the decorative layer from the panel.

BRIEF DESCRIPTION OF THE DRAWINGS

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Figure 1:
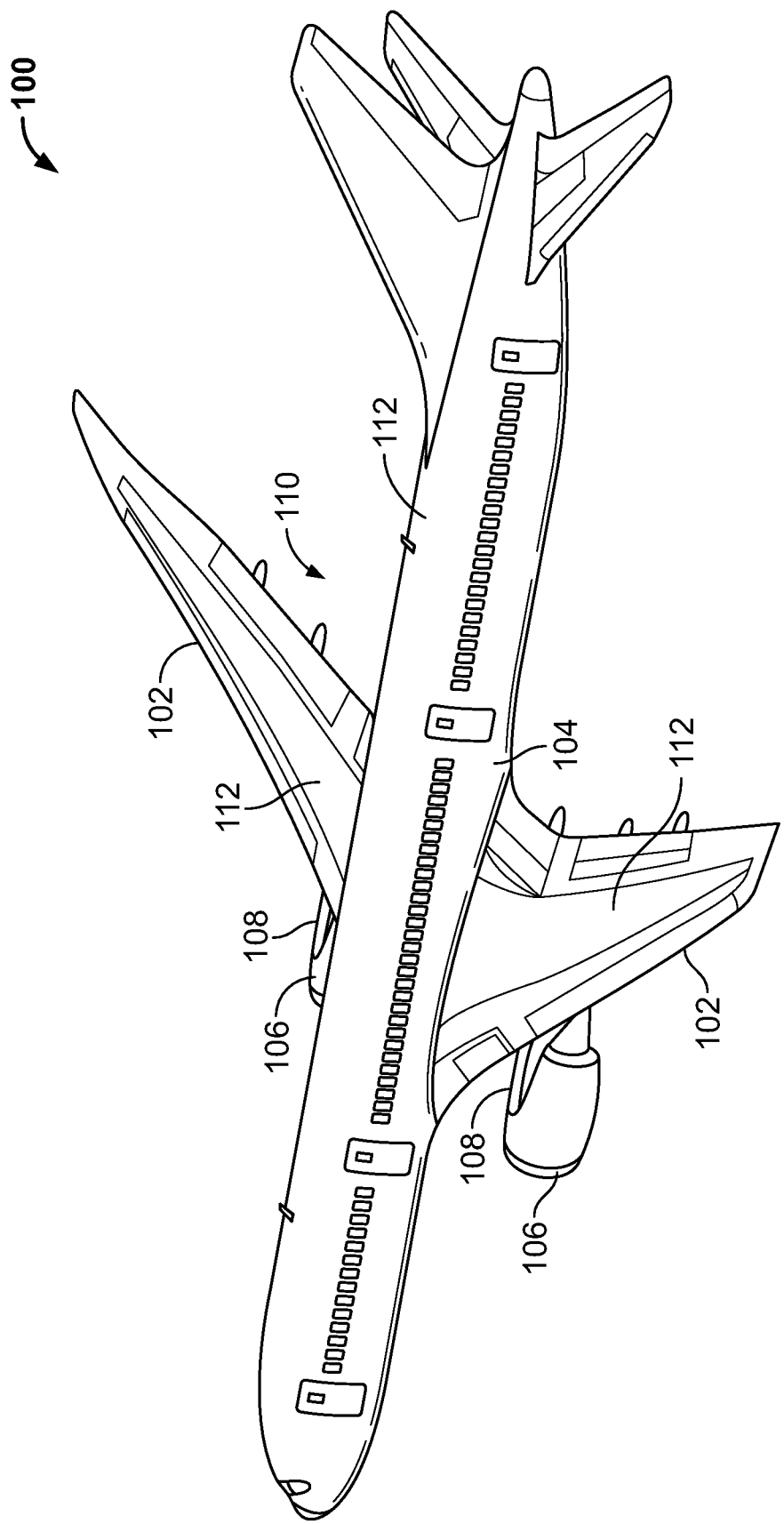
FIG. 1 depicts an example aircraft in accordance with the teachings herein.

Surfaces in public spaces (e.g., billboards, building walls, vehicle panels, etc.) oftentimes include decorative images for aesthetic, informational, and/or advertising purposes. For example, known aircraft and/or other vehicles (e.g., buses, trains, tractor-trailers, ships, etc.) often include decorative images on their surfaces for identification and/or advertising purposes. In some examples, the visible surfaces of aircraft interiors include decorative images that identify respective airline carriers associated with the aircraft.

Some known decorative images are formed on a decorative layer (e.g., a decorative laminate) that is coupled to a corresponding surface. For example, decorative layers are coupled to panels of aircraft via an adhesive layer. In some instances, a portion of the decorative layer or laminate may separate from the surface to which it is coupled. For example, a pocket of gas and/or vapor (e.g., water vapor) may form between the decorative laminate and the surface, thereby causing an adjacent portion of the decorative laminate to bubble. Such separation between the decorative laminate and the surface may be undesirable for aesthetic purposes (e.g., bubbling of the decorative laminate may be aesthetically unappealing) and/or may cause the decorative laminate to become damaged and/or to further separate (e.g., delaminate) from the surface over time.

In some instances, pockets of gas and/or vapor are entrapped between a decorative laminate and a surface of a panel (e.g., a surface in a compartment of the aircraft, etc.) when the decorative laminate is initially coupled to the surface. That is, the separation results from the decorative laminate not being laid flush with the surface when the decorative laminate is initially coupled to the surface.

In other instances, the pockets of gas and/or vapor that cause separation between the decorative laminate and the surface form as a result of the gas and/or vapor escaping from material of the panel and becoming trapped (e.g., to form a bubble) between the decorative laminate and the panel. When a decorative laminate is coupled to a panel of an aircraft, gas and/or vapor (e.g., water vapor) may be emitted from a core layer (e.g., a honeycomb core, a foam core, etc.) of the panel and subsequently become trapped between the decorative laminate and the surface of the panel. For example, the gas and/or vapor may escape and/or may be emitted from the core layer of the panel when there is a difference in pressure and/or temperature between the core layer of the panel and the environment exterior to the panel. For example, the gas and/or vapor may migrate from the core layer toward the decorative laminate when pressure closer to the core layer is greater than pressure closer to the decorative laminate. The gas and/or vapor becomes trapped between the decorative laminate as a result of the decorative laminate being composed of substantially impermeable and/or nonporous material that deters and/or impedes the gas and/or vapor of the core layer from traversing therethrough. The trapped gas and/or vapor creates an internal pressure between the decorative laminate and the panel that applies a concentrated force to the decorative laminate and/or the surface, thereby causing the decorative laminate to separate from the surface of the panel (e.g., from the surface in the aircraft compartment, etc.). Additionally or alternatively, the gas and/or vapor that is trapped between the decorative laminate and the panel may originate from an interaction (e.g., a chemical reaction, a physical reaction, etc.) between components of the panel and/or the decorative laminate such as between the core layer and a reinforcing layer of the panel, between the reinforcing layer and an adhesive coupled to the decorative laminate, etc.

To impede gas and/or vapor from causing a portion of a decorative layer coupled to a panel from separating from the panel, the example methods and apparatus disclosed herein include a reinforcing layer that has a rigidity and which is positioned between the panel and the decorative layer to dissipate concentrated forces exerted by the gas and/or vapor onto the decorative layer. For example, the gas and/or vapor that escapes and/or is emitted from the panel becomes trapped between the decorative layer and, as a result, creates an internal pressure that applies a concentrated force to an adjacent portion of the decorative layer. The rigidity of the reinforcing layer enables the reinforcing layer to dissipate the concentrated force exerted by the trapped gas and/or vapor across a larger section of the decorative layer to deter and/or impede separation between the adjacent portion of the decorative layer and the panel (e.g., to deter and/or impede the decorative layer from bubbling) and/or to reduce a distance of separation between the portion of the decorative panel and the panel (e.g., to reduce visibility of the bubbling). Further, the rigidity of the reinforcing layer decreases manufacturing time and/or costs associated with coupling the decorative layer to the panel by hiding and/or covering otherwise visible irregularities and/or contaminates (e.g., mark-offs, pin holes, contaminates, steps, etc.) when the decorative layer is coupled to the panel without having to sand, sweep and/or otherwise prepare a surface of the panel.

In the examples disclosed herein, the reinforcing layer (e.g., a first reinforcing layer) is coupled to the decorative layer, a coil reduction layer is coupled to the reinforcing layer that is coupled to the decorative layer, and an adhesive layer is applied to the coil reduction layer that is coupled to the reinforcing layer to enable the decorative layer to be coupled to the panel. The coil reduction layer (e.g., a polyvinyl fluoride film such as Tedlar®) reduces coiling of the reinforcing layer by applying a force (e.g., a first force) that counteracts an opposing force (e.g., a second force) applied by the decorative layer. The reinforcing layer is composed of, for example, a fiber reinforcing layer and/or a resin layer. In some examples, the reinforcing layer is a pre-impregnated layer that includes the fiber reinforcing layer and the resin layer having pre-impregnated resin.

In some examples, another reinforcing layer (e.g., a second reinforcing layer) is disposed between the decorative layer and the first reinforcing layer. The first reinforcing layer is coupled to the second reinforcing layer and the second reinforcing layer is coupled to the decorative layer to position the second reinforcing layer between the first reinforcing layer and the decorative layer. The second reinforcing layer may include a foil layer (e.g., a layer of aluminum film) and/or other layer that provides fire resistance.

In some examples, a grid of decorative tiles is formed that may be coupled to a curved surface. For example, the grid is formed from rows and columns of the decorative tiles. Each of the decorative tiles includes the decorative layer, the reinforcing layer, the coil reduction layer, and the adhesive layer. The decorative tiles are coupled together via an adhesive liner that is flexible to enable the decorative tiles to be coupled to the curved surface. In some examples, the adhesive liner is composed of permeable material that is configured to vent gas and/or vapor away from the decorative layer of each of the respective tiles to deter the decorative layers of the decorative tiles from separating from the panel. To form the grid of decorative tiles, the adhesive liner is applied to edges of the decorative tiles. For example, an edge of a decorative tile (e.g., a first edge of a first of the decorative tiles) couples to an edge of an adjacent decorative tile (e.g., a second edge of a second of the decorative tiles).

As used herein, the terms "couple," "coupled," and "coupling" refer to a direct or indirect attachment of one object to another object (e.g., one layer to another layer). For example, a first object is directly attached and, thus, coupled to a second object if a surface of the first object contacts a surface of the second object without any other object disposed therebetween. A first object is indirectly attached and, thus, coupled to a second object if the first object does not directly contact the second object but, instead, is fixed to the second object via intermediate object(s) (e.g., layer(s)) that are positioned between the first and second objects.

Turning to the figures, FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. A compartment 110 (e.g., a cargo compartment, a passenger compartment, a flight deck, etc.) is disposed within the fuselage 104 of the illustrated example. The wings 102 and the fuselage 104 define an outer surface 112 of the aircraft 100.

Figure 2A:
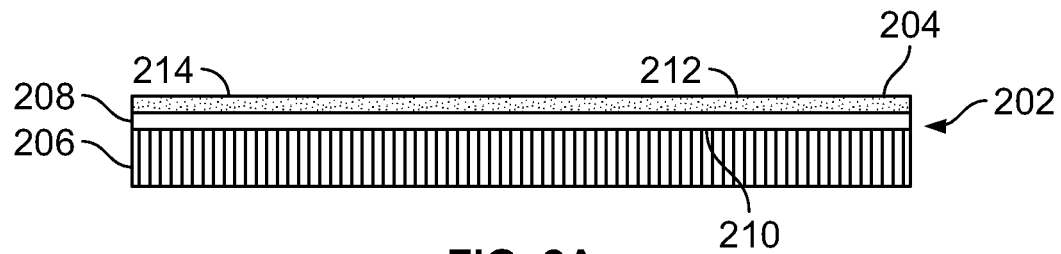
FIG. 2A is a cross-sectional view of a known decorative layer and a portion of a known panel.
Figure 2B:
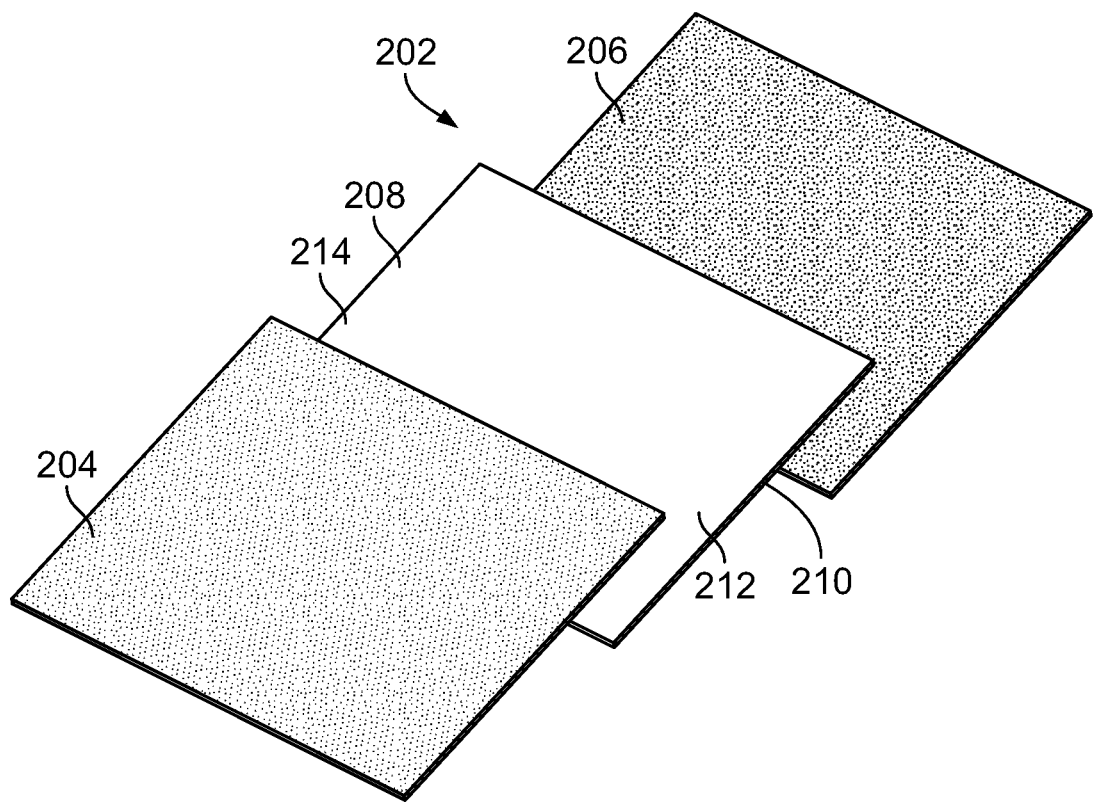
FIG. 2B is an exploded view of the known decorative layer and the portion of the known panel of FIG. 2A.

Before discussing the example decorative layers and the example panels disclosed herein, a brief description of a known panel 202 and a known decorative layer 204 is provided in connection with FIGS. 2A and 2B. More specifically, FIG. 2A is a cross-sectional view of the known decorative layer 204 and a portion of the known panel 202, and FIG. 2B is an exploded view of the known decorative layer 204 and the portion of the known panel 202.

As illustrated in FIGS. 2A and 2B, the known panel 202 includes a core layer 206 and a reinforcing layer 208 coupled to the core layer 206. A first surface 210 of the reinforcing layer 208 engages the core layer 206, and an opposing second surface 212 defines a surface 214 of the panel 202. The reinforcing layer 208 of the known panel 202 may be composed of materials that are partially porous and/or permeable (e.g., resin, reinforcing fiber, etc.) such that some gas and/or vapor (e.g., water vapor) may traverse through the reinforcing layer 208. Further, while not shown in the portion of the known panel 202 illustrated in FIGS. 2A and 2B, another reinforcing layer engages another surface of the core layer 206 opposite the reinforcing layer 208 such that a sandwich-structured composite is formed by the reinforcing layer 208, the core layer 206, and the other opposing reinforcing layer.

Further, the known decorative layer 204 includes decorative features (e.g., colors, patterns, logos, text, etc.) that are to be displayed on the known panel 202. As illustrated in FIG. 2A, the decorative layer 204 is coupled to the surface 214 of the panel 202 to enable the decorative features of the decorative layer 204 to be displayed on the panel 202. For example, the decorative layer 204 is adhesively coupled to the second surface 212 of the reinforcing layer 208.

In some instances, gas and/or vapor is trapped within the core layer 206 of the panel 202 (e.g., trapped between the reinforcing layer 208 and the opposing reinforcing layer of a sandwich-structured composite of the panel 202). When a difference in pressure and/or temperature between the core layer 206 and the environment exterior to the panel 202 occurs (e.g., when pressure closer to the core layer 206 is greater than pressure closer to the decorative layer 204), the gas and/or vapor escape and/or are emitted from the core layer 206 of the panel 202. In other instances, gas and/or vapor of the panel 202 may originate from an interaction (e.g., a chemical reaction, a physical reaction, etc.) between material of the panel 202 (e.g., a honeycomb core, a foam core, resin, reinforcing fiber, etc.) and/or the decorative layer 204 (e.g., a decorative laminate, an adhesive layer, etc.).

Because the decorative layer 204 coupled to the panel 202 is composed of substantially impermeable and/or nonporous material, the vapor and/or gas that is emitted from the core layer 206 traverses through the reinforcing layer 208 and becomes trapped between the decorative layer 204 and the surface 214 of the panel 202. The trapped vapor and/or gas create an internal pressure that applies a concentrated force to an adjacent portion of the decorative layer 204 and/or the surface 214 of the panel 202. For example, the applied force pushes a portion of the decorative layer 204 away from the surface 214 of the panel 202, thereby causing the portion of the decorative layer 204 to separate from the panel 202. In other words, vapor and/or gas of the known panel 202 may form bubbles in the known decorative layer 204 that are aesthetically unappealing and/or which damage the decorative layer 204.

Figure 3:
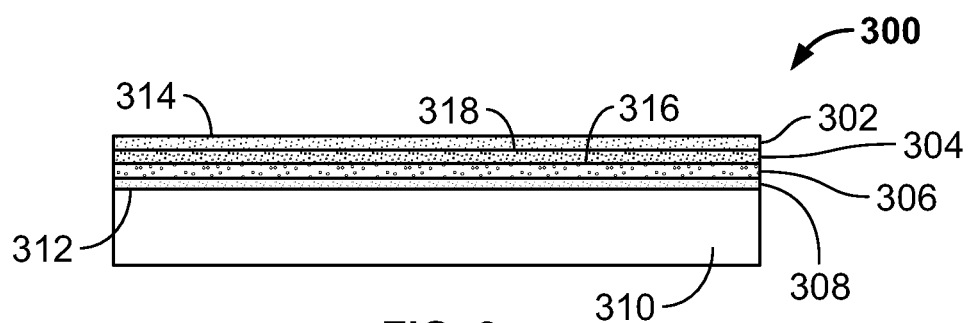
FIG. 3 is a cross-sectional view of an example decorative composite that includes a decorative layer, a reinforcing layer, and a coil reduction layer in accordance with the teachings herein.

FIG. 3 illustrates an example decorative composite 300 in accordance with the teachings disclosed herein. As illustrated in FIG. 3, the decorative composite 300 includes a decorative layer 302, a reinforcing layer 304 (e.g., a first reinforcing layer), a coil reduction layer 306, an adhesive layer 308, all of which are coupled to a panel 310. As disclosed below in further detail, the reinforcing layer 304 dissipates concentrated forces exerted by trapped gas and/or vapor to limit, minimize and/or reduce a distance of separation between a portion of the decorative layer 302 and the panel 310 (e.g., to reduce bubbling of the decorative layer 302), and the coil reduction layer 306 reduces coiling of the reinforcing layer 304 to enable the decorative composite 300 to be coupled to the panel 310.

In the illustrated example, the decorative composite 300 includes the decorative layer 302, the reinforcing layer 304 that is coupled to the decorative layer 302, the coil reduction layer 306 that is coupled to the reinforcing layer 304 opposite the decorative layer 302, and the adhesive layer 308 is applied to the coil reduction layer 306 to enable the decorative composite 300 to couple to the panel 310. The adhesive layer 308 defines an inner surface 312 of the decorative composite 300 that engages the panel 310, and the decorative layer 302 defines an opposing surface 314 to display decorative features.

The decorative layer 302 of the illustrated example includes the decorative features (e.g., colors, patterns, logos, text, etc.) and is coupled to the panel 310 to enable the decorative features to be displayed on a surface formed by the panel 310 (e.g., on the outer surface 112 of the aircraft 100 and/or a surface of a bin (e.g., a stow-bin), a lining (e.g., of a sidewall, a ceiling, etc.), furnishings (e.g., a monument, a closet, a crew-rest, a lavatory, etc.) located in the compartment 110 of the aircraft 100 of FIG. 1, etc.). For example, the decorative layer 302 is coupled to the outer surface 112 of the aircraft 100 to identify and/or advertise an airline carrier associated with the aircraft 100. The decorative layer 302 is composed of polyvinyl fluoride (Tedlar®), polyvinylidene fluoride, and/or other any other impermeable material that produces characteristics of the decorative layer 302 such as aesthetic appearance, UV resistance, fire resistance, chemical resistance, color durability, strength, etc. For example, without departing from the present teaching, the decorative layer 302 may include a flame-retardant additive that enables the decorative layer 302 to provide flame-penetration resistance to the panel 310 to which the decorative layer 302 is coupled (e.g., to the outer surface 112 and/or a surface in the compartment 110 of the aircraft 100).

The reinforcing layer 304 that is coupled to the decorative layer 302 includes, for example, a fiber reinforcing layer and/or a resin layer. In examples in which the reinforcing layer 304 includes the fiber reinforcing layer, the fiber reinforcing layer may be composed of fiberglass, graphite-cloth, synthetic fiber (e.g., Aramid fiber), natural fiber (e.g., wood, flax, cellulose, jute, hemp, straw, switch grass, kenaf, cotton, coir, bamboo, etc.), a combination thereof, and/or any other material that provides strength (e.g., compression strength) to the reinforcing layer 304. In some examples, the reinforcing layer 304 is a pre-impregnated layer (i.e., prepreg) in which the fiber reinforcing layer is pre-impregnated with resin (e.g., the resin is pre-dried but not pre-cured upon formation of the reinforcing layer 304). In examples in which the reinforcing layer 304 includes the resin layer, the resin, when cured, provides a rigidity (e.g., a resistance to flexing, deflection, deformation, etc.) to the reinforcing layer 304 that enables the reinforcing layer 304 to dissipate concentrated forces acting on the decorative layer 302 limit, minimize and/or reduce a distance of separation between a portion of the decorative layer 302 and the panel 310. Further, in some examples, the reinforcing layer 304 is at least partially permeable and/or porous as a result of the resin of the reinforcing layer 304 not being co-cured to adjacent layers (e.g., the decorative layer 302, the coil reduction layer 306) of the decorative composite 300.

In the illustrated example, the coil reduction layer 306 is coupled to the reinforcing layer 304 that is coupled to the decorative layer 302. As illustrated in FIG. 3, the coil reduction layer 306 is coupled to an inner surface 316 of the reinforcing layer 304, and the decorative layer 302 is coupled to an opposing surface 318 of the reinforcing layer 304. In some examples, the decorative layer 302 exerts a force on the surface 318 of the reinforcing layer 304. For example, the force is exerted as a result of the different materials of the decorative layer 302 and the reinforcing layer 304 reacting differently (e.g., contracting, expanding, hardening, etc.) to heat and/or pressure that is applied to form the decorative composite 300. The force exerted by the decorative layer 302 may cause the reinforcing layer 304 and, thus, the decorative composite 300 to curl, thereby making it difficult to couple the decorative composite 300 to the panel 310. To deter and/or impede the reinforcing layer 304 and, thus, the decorative composite 300 from curling, the coil reduction layer 306 is composed of a material (e.g., polyvinyl fluoride such as Tedlar®) that causes the coil reduction layer 306 to exert a force on the inner surface 316 of the reinforcing layer 304. That is, to deter and/or impede the reinforcing layer 304 from coiling, the coil reduction layer 306 applies a force (e.g., a first force) to the inner surface 316 of the reinforcing layer 304 to counteract an opposing and substantially equal force (e.g., a second force) exerted onto the surface 318 by the decorative layer 302. For example, the material of the coil reduction layer 306 has a coefficient of thermal expansion (CTE) that is substantially equal to that of the material of the decorative layer 302 to enable the coil reduction layer 306 to apply the counteracting force (e.g., the coil reducing force) to the reinforcing layer 304. The CTE indicates an amount of expansion or contraction of the material relative to a change in temperature. Thus, the coil reduction layer 306 is composed of a material that expands and/or contracts at a substantially equal rate as the material of the decorative layer 302 to enable the coil reduction layer 306 to apply the counteracting force that reduces coiling of the reinforcing layer 304.

The adhesive layer 308 is composed of, for example, a pressure-sensitive adhesive (e.g., an acrylic pressure-sensitive adhesive) that enables the decorative composite 300 to be securely coupled to the panel 310. In some examples, a primer and/or sealer is applied to further enable the decorative composite 300 to be securely coupled to the panel 310. In the illustrated example, the adhesive layer 308 has a thickness of about between 0.001 inches (0.025 millimeters) and 0.1 inches (2.54 millimeters). In some examples, the adhesive layer 308 includes a flame-retardant additive that enables the adhesive layer 308 to provide flame-penetration resistance to the panel 310 to which it is coupled (e.g., the outer surface 112 and/or a surface in the compartment 110 of the aircraft 100).

The panel 310 of the illustrated example from which gas and/or vapor (e.g., water vapor) may originate forms a surface of a vehicle (e.g., the outer surface 112 and/or a surface in the compartment 110 of the aircraft 100 of FIG. 1), a building and/or another structure on which decorative features are to be displayed for aesthetic, identification and/or advertising purposes. The panel 310 is composed of permeable and/or porous materials (e.g., honeycomb core, foam core, resin, reinforcing fiber, etc.) that enable the gas and/or vapor to escape and/or be emitted from the panel 310. For example, gas and/or vapor initially is trapped within a core layer of the panel 310. Additionally or alternatively, the gas and/or vapor may originate from an interaction (e.g., a chemical reaction, a physical reaction, etc.) between the materials of the panel 310 (e.g., a honeycomb core, a foam core, resin, reinforcing fiber, etc.) when the panel 310 is formed. When a difference in pressure and/or temperature between the panel 310 and the surrounding environment occurs (e.g., when pressure closer to the core layer is greater than pressure closer to the decorative layer 302), the trapped gas and/or vapor escapes and/or is emitted from the panel 310.

As illustrated in FIG. 3, the inner surface 312 of the decorative composite 300 is coupled to the panel 310. Because the adhesive layer 308, the coil reduction layer 306, and the reinforcing layer 304 are composed of at least partially permeable material, some gas and/or vapor (e.g., water vapor) that is emitted from the panel 310 may permeate through the adhesive layer 308, the coil reduction layer 306, and the reinforcing layer 304 of the decorative composite 300 and to the decorative layer 302. The decorative layer 302 is composed of substantially non-porous and/or impermeable material and, thus, traps the emitted gas and/or vapor between the decorative layer 302 and the adjacent reinforcing layer 304. The trapped gas and/or vapor creates an internal pressure that exerts a force on the decorative layer 302 and/or the reinforcing layer 304. The rigidity of the reinforcing layer 304 dissipates the force exerted by the trapped gas and/or vapor across a larger section of the reinforcing layer 304 and/or the decorative layer 302 to deter and/or impede separation between the decorative layer 302 and the panel 310 (e.g., to deter and/or impede the decorative layer from bubbling) and/or to reduce a distance of separation between the decorative layer 302 and the panel 310 (e.g., to reduce visibility of the bubbling). Further, the rigidity of the reinforcing layer 304 decreases manufacturing time and/or costs associated with coupling the decorative layer 302 to the panel 310 by hiding and/or covering otherwise visible irregularities and/or contaminates (e.g., mark-offs, pin holes, contaminates, steps, etc.) when the decorative layer 302 is coupled to the panel 310 without having to sand, sweep and/or otherwise prepare the panel 310 for finishing.

Figure 4:
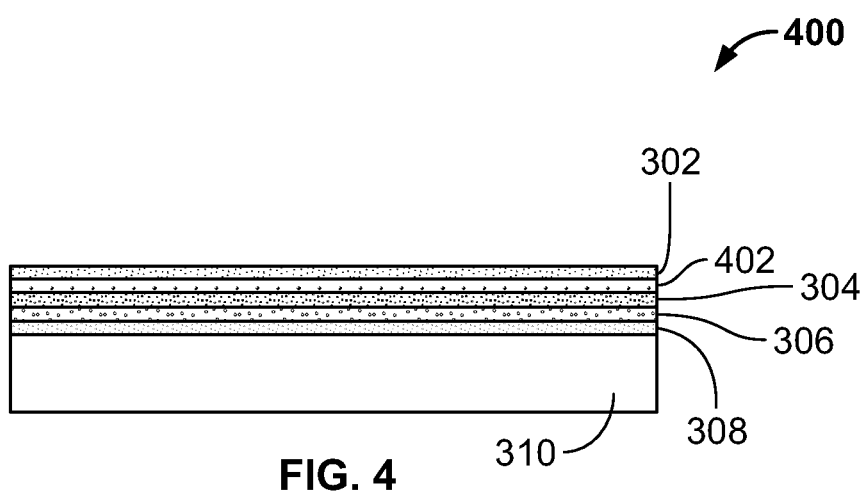
FIG. 4 is another cross-sectional view of another example decorative composite that includes a decorative layer, a reinforcing layer, and a coil reduction layer in accordance with the teachings herein.

FIG. 4 illustrates another example decorative composite 400 in accordance with the teachings disclosed herein. As illustrated in FIG. 4, the decorative composite 400 includes the decorative layer 302, the reinforcing layer 304 (e.g., a first reinforcing layer), a second reinforcing layer 402, the coil reduction layer 306, and the adhesive layer 308. The first reinforcing layer 304 dissipates concentrated forces to limit, minimize and/or reduce a distance of separation between a portion of the decorative layer 302 and the panel 310, the coil reduction layer 306 reduces coiling of the reinforcing layer 304 to enable the decorative composite 400 to be coupled to the panel 310, and the second reinforcing layer 402 provides further insulation (e.g., noise reduction, fire resistance) to the decorative composite 400.

The decorative layer 302, the first reinforcing layer 304, the coil reduction layer 306, the adhesive layer 308, and the panel 310 of FIG. 4 are substantially similar or identical to those components having the same reference numbers in FIG. 3. In the illustrated example, the second reinforcing layer 402 is coupled to the decorative layer 302, and the first reinforcing layer 304 is coupled to the second reinforcing layer 402 that is coupled to the decorative layer 302. Further, the coil reduction layer 306 is coupled to the second reinforcing layer 402 opposite the second reinforcing layer 402 and the decorative layer 302, and the adhesive layer 308 is applied to the coil reduction layer 306 to enable the decorative composite 400 to couple to the panel 310. The second reinforcing layer 402 that is coupled to the decorative layer 302 includes, for example, a foil and/or other layer that provides insulation, a fiber reinforcing layer and/or a resin layer. For example, the foil layer of the second reinforcing layer 402 is composed of aluminum and/or any other material that increases and/or improves fire resistance provided by the decorative composite 400. The second reinforcing layer 402 may be at least partially permeable and/or porous as a result of the resin of the second reinforcing layer 402 not being co-cured to adjacent layers (e.g., the decorative layer 302, the reinforcing layer 304) of the decorative composite 400.

Figure 5:
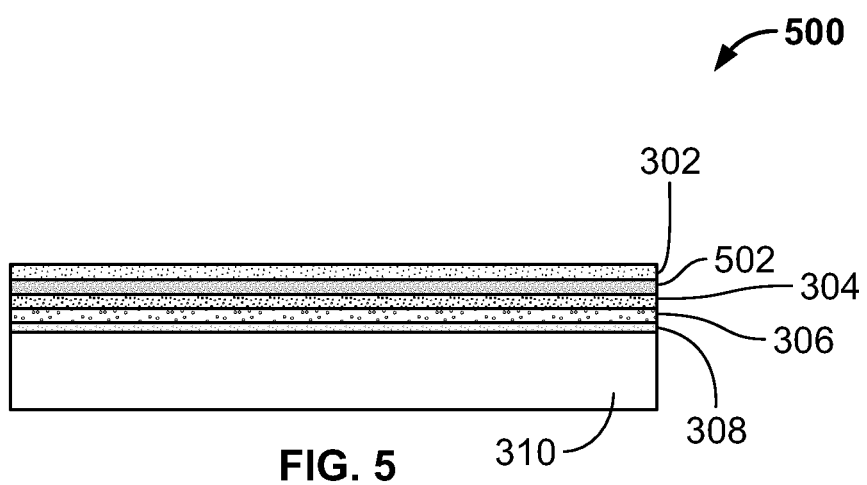
FIG. 5 is another cross-sectional view of another example decorative composite that includes a decorative layer, a reinforcing layer, and a coil reduction layer in accordance with the teachings herein.

FIG. 5 illustrates another example decorative composite 500 in accordance with the teachings disclosed herein. As illustrated in FIG. 5, the decorative composite 500 includes the decorative layer 302, the reinforcing layer 304 (e.g., a first reinforcing layer), a second reinforcing layer 502, the coil reduction layer 306, and the adhesive layer 308. The reinforcing layers 304, 502 dissipate concentrated forces to limit, minimize and/or reduce a distance of separation between a portion of the decorative layer 302 and the panel 310, and the coil reduction layer 306 reduces coiling of the reinforcing layers 304, 502 to enable the decorative composite 400 to be coupled to the panel 310.

The decorative layer 302, the first reinforcing layer 304, the coil reduction layer 306, the adhesive layer 308, and the panel 310 of FIG. 5 are substantially similar or identical to those components having the same reference numbers in FIG. 3. Further, the second reinforcing layer 502 of FIG. 5 is substantially similar or identical to the reinforcing layer 304 of FIGS. 3-5. Because the reinforcing layer 304 is described in detail in connection with FIG. 3, some characteristics of the second reinforcing layer 502 of FIG. 5 are not described in further detail below.

As illustrated in FIG. 5, the second reinforcing layer 502 is coupled to the decorative layer 302, and the first reinforcing layer 304 is coupled to the second reinforcing layer 502 that is coupled to the decorative layer 302. The coil reduction layer 306 is coupled to the first reinforcing layer 304 opposite the second reinforcing layer 502 and the decorative layer 302, and the adhesive layer 308 is applied to the coil reduction layer 306 to enable the decorative composite 500 to couple to the panel 310. Some gas and/or vapor (e.g., water vapor) that is emitted from the panel 310 of the illustrated example may permeate through the adhesive layer 308, the coil reduction layer 306, and the reinforcing layer 304, 502 and to the decorative layer 302 of the decorative composite 500. The rigidity of the reinforcing layers 304, 502 dissipate a force exerted by the trapped gas and/or vapor across a larger section of the first reinforcing layer 304 and/or the decorative layer 302 to limit, minimize and/or reduce a distance of separation between the decorative layer 302 and the panel 310.

Figure 6:
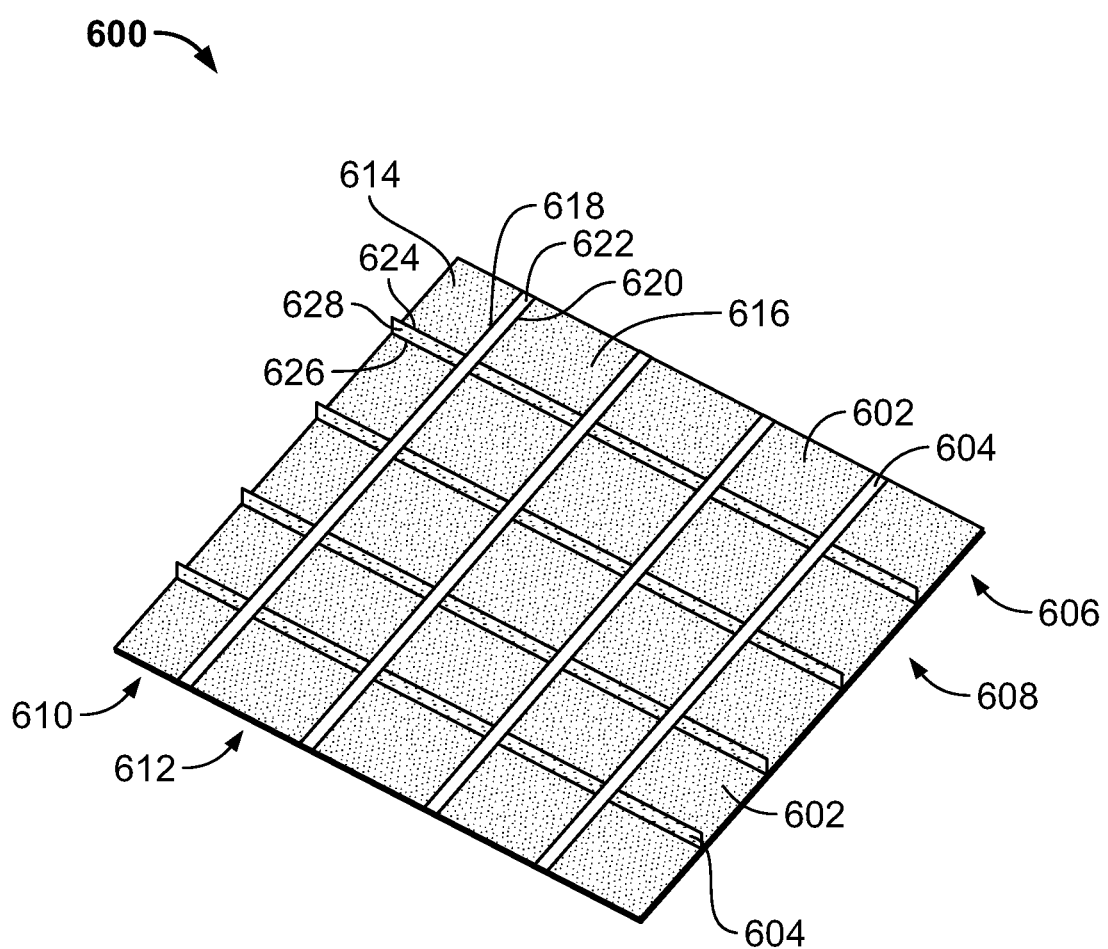
FIG. 6 is another cross-sectional view of an example grid of decorative tiles of the example composites of FIGS. 3, 4 and/or 5 in accordance with the teachings herein.

FIG. 6 illustrates an example grid 600 of decorative tiles 602 coupled together via adhesive liner 604 in accordance with the teachings herein. As disclosed below in further detail, the adhesive liner 604 forms the grid 600 to enable the decorative tiles 602 to couple to a curved surface.

Each of the decorative tiles 602 of FIG. 6 may be substantially similar or identical to the decorative composite 300 of FIG. 3, the decorative composite 400 of FIG. 4 and/or the decorative composite 500 of FIG. 5. Because the decorative composites 300, 400, and 500 are described in detail in connection with FIGS. 3-5, respectively, some characteristics of the decorative tiles 602 of FIG. 6 are not described in further detail below.

The grid 600 includes rows and/or columns of the decorative tiles 602 coupled together via the adhesive liner 604. In the illustrated example, the grid 600 includes a first row 606, a second row 608, etc. and a first column 610, a second column 612, etc. A first decorative tile 614 forms part of the first row 606 and the first column 610 of the grid 600, and an adjacent second decorative tile 616 forms part of the first row 606 and the second column 612 of the grid 600. In the first row 606, an edge 618 (e.g., a first edge) of the first decorative tile 614 and an adjacent edge 620 (e.g., a second edge) of the second decorative tile 616 are coupled together via a portion 622 of the adhesive liner 604 that is disposed between the edges 618 and 620. Further, an edge 624 (e.g., a third edge) of the first row 606 and an adjacent edge 626 (e.g., a fourth edge) of the second row 608 are coupled together via a portion 628 of the adhesive liner 604 that is disposed between the edges 624 and 626. The adhesive liner 604 is applied to, for example, edges (e.g., the edges 618, 620, the edges 624, 626) of reinforcing layers (e.g., the reinforcing layer 304 of FIGS. 3-5, the reinforcing layer 402 of FIG. 4, the reinforcing layer 502 of FIG. 5) and/or coil reduction layers (e.g., the coil reduction layer 306 of FIGS. 3-5) of the adjacent decorative tiles 602 to couple the decorative tiles 602 together. Thus, to form the grid 600 of the decorative tiles 602, the adhesive liner 604 is disposed between the decorative tiles 602 to couple edges of the respective decorative tiles 602 together. In other examples, the decorative tiles 602 are coupled to an adhesive sheet (e.g., a surface of each of the decorative tiles 602 is coupled to a single sheet) to form the grid 600.

While the decorative tiles 602 of the illustrated example are positioned in rows and columns (e.g., the rows 606, 608, the columns 610, 612), the grid 600 of the decorative tiles 602 may form other patterns (e.g., staggered, diagonal, etc.). Further, in the illustrated example, the decorative tiles 602 of the grid 600 are rectangular (e.g., square). For example, each of the decorative tiles 602 has a width and/or a length of about between 2 inches (50.8 millimeters) and 3 inches (76.2 millimeters). In other examples, the decorative tiles may be another polygonal shape (e.g., triangular, pentagonal, heptagonal, etc.), circular, elliptical and/or any other shape. In some examples, the liner 604 has a width of about 0.125 inches (3.175 millimeters) such that decorative tiles 602 are spaced apart from each other by about 0.125 inches (3.175 millimeters).

The adhesive liner 604 is composed of, for example, flexible material that enables the grid 600 to bend and/or curl and, thus, couple to a curved surface. The flexible material of the adhesive liner 604 may be substantially non-stretchable to deter and/or impede the adhesive liner 604 from enabling gas and/or vapor to traverse therethrough. For example, the adhesive liner 604 is composed of resin material of a reinforcing layer (e.g., the reinforcing layer 304 of FIGS. 3-5, the reinforcing layer 402 of FIG. 4 and/or the reinforcing layer 502 of FIG. 5) of the decorative tiles 602 and has a thickness less than that of the reinforcing layer of the decorative tiles 602 to enable the adhesive liner 604 to flex. Additionally or alternatively, the adhesive liner 604 is composed of a permeable material that enables gas and/or vapor (e.g., water vapor emitted from the panel 310 of FIGS. 3-5) to move away from the decorative tiles 602 to deter and/or impede a portion of the decorative layer 302 (FIGS. 3-5) of one of the decorative tiles 602 from separating from the panel 310 (e.g., to deter and/or impede bubbling in the decorative tiles 602) due to force from the build-up of gas and/or vapor.

Further, the grid 602 of the decorative tiles 602 enables localized repair of the decorative tiles 602 and/or the adhesive liner 604. For example if a portion of adhesive liner 604 becomes damaged, that portion of the adhesive liner 604 may be removed and repaired and/or replaced without affecting other portions of the adhesive liner 604 and/or the decorative tiles 602. Similarly, one of the decorative tiles 602 (e.g., the first decorative tile 614, the second decorative tile 616) may be removed and repaired and/or replaced without affecting the adhesive liner 604 and/or the other decorative tiles 602.

Figure 7:
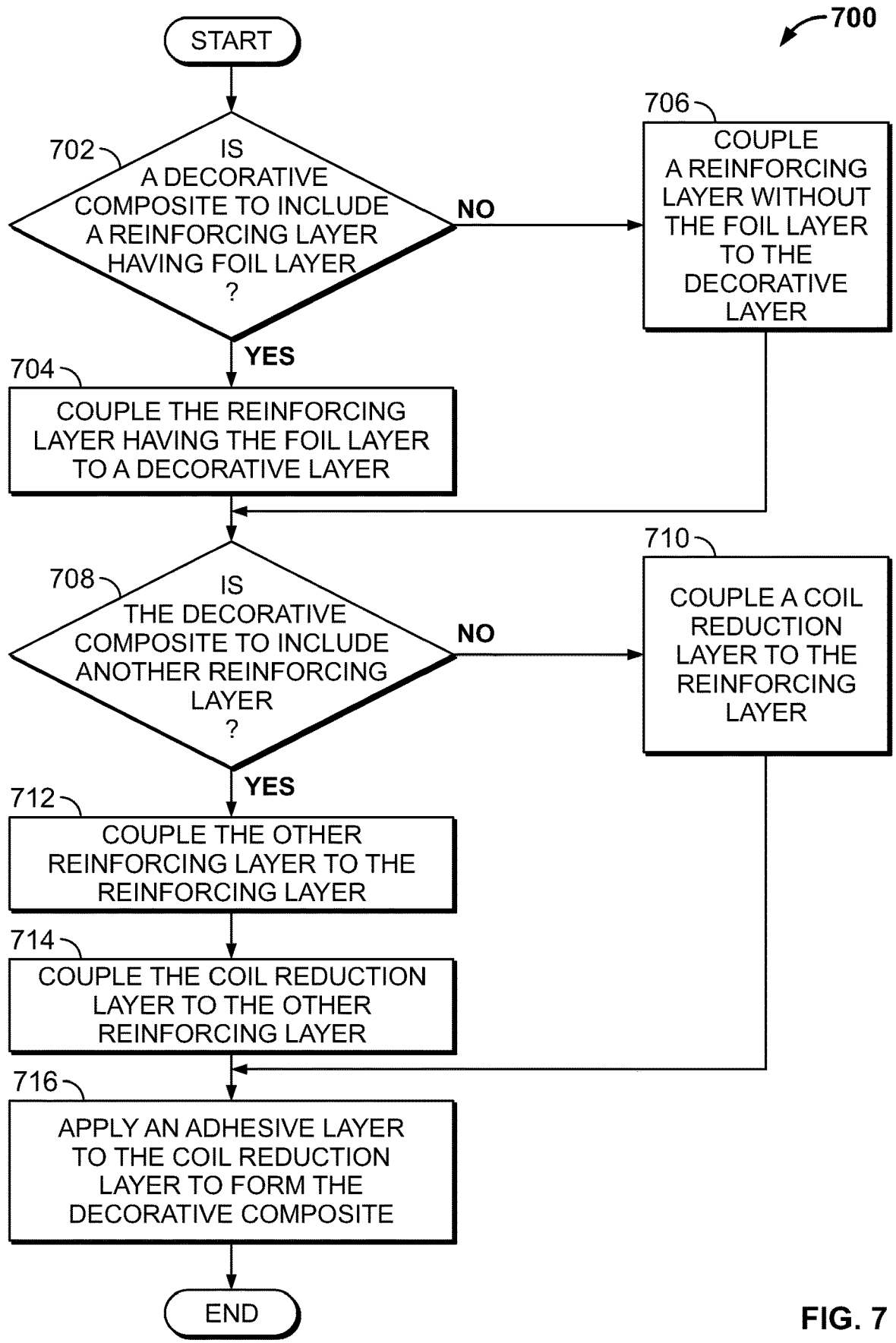
FIG. 7 is a flowchart representative of an example method to assemble the example decorative composite of FIG. 3, the example decorative composite of FIG. 4, the example decorative composite of FIG. 5 and/or each of the example decorative tiles of FIG. 6 in accordance with the teachings herein.

FIG. 7 is a flowchart representative of an example method 700 to assemble an example decorative composite in accordance with the teachings herein. Although the example method 700 is described with reference to the flowchart illustrated in FIG. 7, many other methods for assembling the decorative composite may alternatively be used. For example, the order of execution of the blocks may be changed, and/or some of the blocks described changed, eliminated, and/or combined.

The method 700 for assembling a decorative composite is discussed in connection with the decorative composite 300 of FIG. 3, the decorative composite 400 of FIG. 4, the decorative composite 500 of FIG. 5 and/or the decorative tiles 602 of FIG. 6. Further, because the method 700 may refer to the decorative composite 300 of FIG. 3, the decorative composite 400 of FIG. 4, the decorative composite 500 of FIG. 5 and/or the decorative tiles 602 of FIG. 6, components identified in FIGS. 3-6 having functions substantially similar or identical to the functions of components described below will not be described in detail again. Instead, the same reference numbers will be used for like structures.

The example method 700 disclosed herein starts at block 702 by determining whether a decorative composite (e.g., the decorative composite 300 of FIG. 3, the decorative composite 400 of FIG. 4, the decorative composite 500 of FIG. 5, the decorative tiles 602 of FIG. 6) is to include a reinforcing layer having a foil layer (e.g., the reinforcing layer 402 of FIG. 4). If the decorative composite is to include such a reinforcing layer, the reinforcing layer having the foil layer is coupled to a decorative layer (e.g., the decorative layer 302 of FIGS. 3-5) (block 704). If the decorative composite is not to include such a reinforcing layer, a reinforcing layer without a foil layer (e.g., the reinforcing layer 304 of FIG. 3, the reinforcing layer 502 of FIG. 5) is coupled to the decorative layer (block 706).

At block 708, the example method 700 determines whether the decorative composite is to include another reinforcing layer (e.g., the reinforcing layer 304 of FIGS. 4-5). If the decorative composite is not to include another reinforcing layer, a coil reduction layer (e.g., the coil reduction layer 306 of FIGS. 3-5) is coupled to the reinforcing layer of block 706 or block 708 (block 710). If the decorative composite is to include another reinforcing layer, the other reinforcing layer is coupled to the reinforcing layer of block 706 or block 708 (block 712). Subsequently, at block 714, the coil reduction layer is coupled to the other reinforcing layer (block 714). At block 716, the example method 700 includes applying an adhesive layer (e.g., the adhesive layer 308 of FIGS. 3-5) to the coil reduction layer to form the decorative composite.

Figure 8:
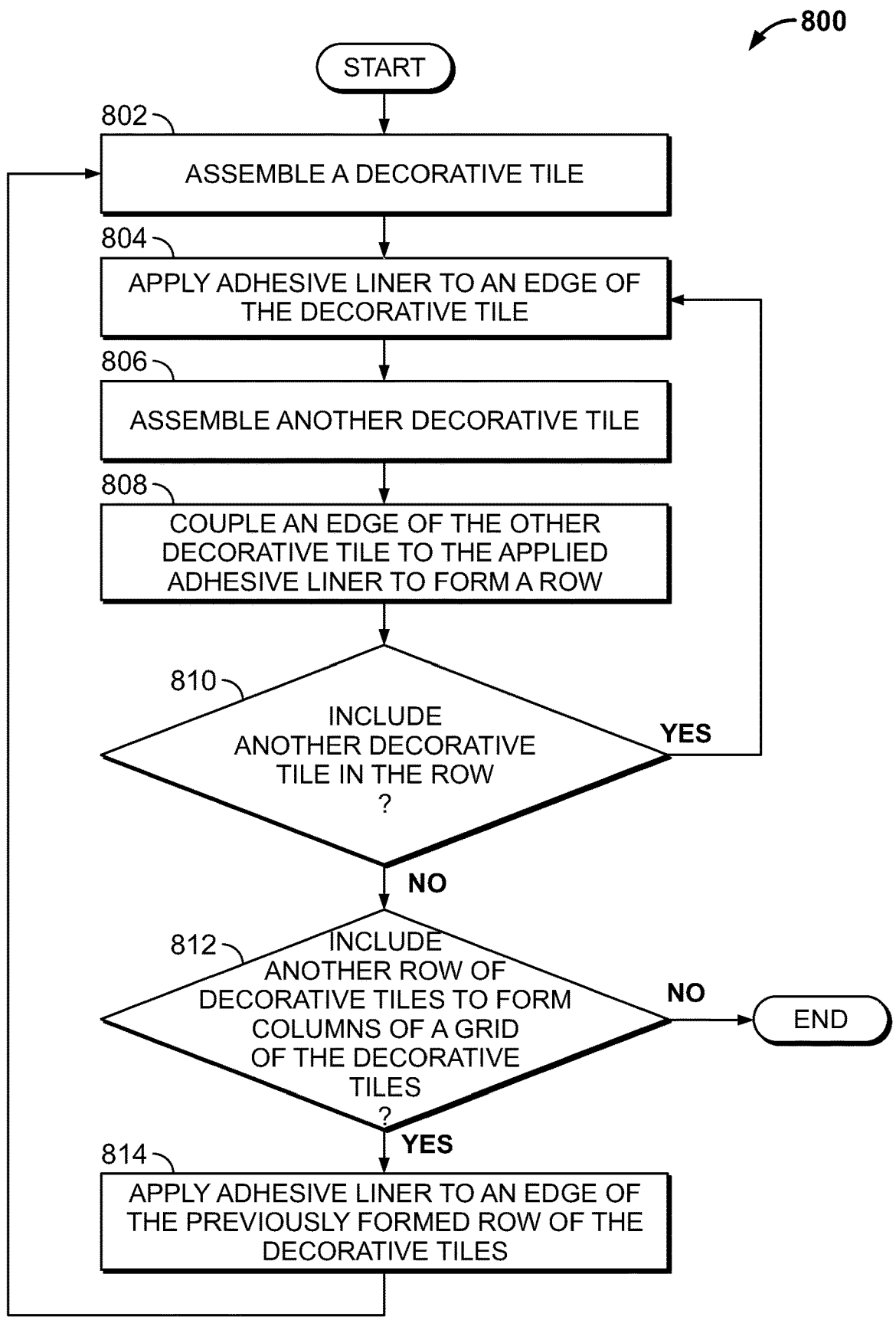
FIG. 8 is a flowchart representative of an example method to assemble the example grid of the example decorative tiles of FIG. 6 in accordance with the teachings herein.

FIG. 8 is a flowchart representative of an example method 800 to assemble an example grid of example decorative tiles in accordance with the teachings herein. Although the example method 800 is described with reference to the flowchart illustrated in FIG. 8, many other methods for assembling the grid of the decorative tiles may alternatively be used. For example, the order of execution of the blocks may be changed, and/or some of the blocks described changed, eliminated, and/or combined.

The method 800 for assembling a grid of decorative tiles is discussed in connection with the grid 600 of FIG. 6. Further, because the method 800 may refer to the grid 600 of FIG. 6, components identified in FIG. 6 having functions substantially similar or identical to the functions of components described below will not be described in detail again. Instead, the same reference numbers will be used for like structures.

The example method 800 disclosed herein starts at block 802 by assembling a decorative tile (e.g., the first decorative tile 614 of the decorative tiles 602 of FIG. 6). At block 804, adhesive liner (e.g., the portion 622 of the adhesive liner 604 of FIG. 6) is applied to an edge (e.g., the edge 618 of FIG. 6) of the decorative tile. Further, at block 806, another decorative tile (e.g., the second decorative tile 616 of the decorative tiles 602 of FIG. 6) is assembled. At block 808, an edge (e.g., the edge 620 of FIG. 6) of the other decorative tile is coupled to the applied adhesive layer to form a row (e.g., the first row 606 of FIG. 6) of a grid (e.g., the grid 600 of FIG. 6) of the decorative tiles.

The example method 800 includes determining whether to include another decorative tile (another of the decorative tiles 602 of FIG. 6) in the row (block 810). Blocks 802, 804, 806, 808, 810 are repeated if another of the decorative tiles is to be included in the row. For example, blocks 802, 804, 806, 808, 810 are repeated until no other decorative tiles are to be added to the row.

At block 812, the example method 800 includes identifying whether to include another row (e.g., the second row 608 of FIG. 6) of the decorative tiles to form columns (e.g., the first column 610 and the second column 612 of FIG. 6) of a grid (e.g., the grid 600 of FIG. 6) of the decorative tiles. If another row is identified, the adhesive liner (e.g., the portion 628 of the adhesive liner 604 of FIG. 6) is applied to an edge (e.g., the edge 624 of FIG. 6) of the previously formed row of the decorative tiles (block 814). Further, blocks 802, 804, 806, 808, 810 are repeated to couple the rows of the decorative tiles together. As illustrated in FIG. 8, blocks 802, 804, 806, 808, 810, 812, 814 are repeated until no other rows of the decorative tiles are identified.

Although certain example methods and apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A decorative composite configured to be coupled to a panel, the decorative composite comprising:
    a first decorative tile including a first decorative layer and a first edge;
    a second decorative tile including a second decorative layer and a second edge, the first and second decorative layers composed of an impermeable material that prevents at least one of vapor or gas from escaping at least one of the first decorative tile or the second decorative tile, the first and second decorative layers forming an outer surface of the decorative composite, the second edge adjacent the first edge; and
    an adhesive liner disposed between and contacting the first edge and the second edge to couple the first decorative tile to the second decorative tile, the adhesive liner forming an inner surface of the decorative composite, the inner surface configured to be coupled to the panel, the adhesive liner composed of a permeable material configured to vent at least one of gas or vapor away from the first decorative layer and the second decorative layer to deter separation of the first decorative tile and the second decorative tile from the panel when the decorative composite is coupled to the panel.

2. The decorative composite as defined in claim 1, wherein the adhesive liner is flexible to enable the decorative composite to be coupled to a curved surface of the panel.

3. The decorative composite as defined in claim 2, further including a third decorative tile positioned adjacent the first decorative tile and a fourth decorative tile positioned adjacent the second decorative tile.

4. The decorative composite as defined in claim 1, wherein at least one of the first decorative tile or the second decorative tile is removably coupled to the panel via the adhesive liner.

5. The decorative composite as defined in claim 1, wherein the first decorative tile further includes a first reinforcing layer coupled to the first decorative layer, the first reinforcing layer forming at least a portion of the first edge.

6. The decorative composite as defined in claim 5, wherein the first reinforcing layer includes at least one of a resin layer or a pre-impregnated layer.

7. The decorative composite as defined in claim 5, wherein the first decorative tile further includes a second reinforcing layer disposed between the first decorative layer and the first reinforcing layer, the second reinforcing layer forming at least a portion of the first edge.

8. The decorative composite as defined in claim 7, wherein the second reinforcing layer includes a foil layer.

9. The decorative composite as defined in claim 5, wherein the first decorative tile further includes a first coil reduction layer coupled to the first reinforcing layer, the first coil reduction layer forming at least a portion of the first edge, the first coil reduction layer having a coefficient of thermal expansion that is substantially equal to a coefficient of thermal expansion of the first decorative layer.

10. The decorative composite as defined in claim 9, wherein the first coil reduction layer is a polyvinyl fluoride film.

11. The decorative composite of claim 1, wherein the decorative composite includes a plurality of decorative tiles arranged in a plurality of rows and a plurality of columns, the plurality of decorative tiles including the first and second decorative tiles.

12. The decorative composite as defined in claim 11, wherein the adhesive liner is disposed between and contacts adjacent edges of neighboring ones of the plurality of decorative tiles to couple together the neighboring ones the plurality of decorative tiles.

13. The decorative composite as defined in claim 12, wherein the adhesive liner forms a grid between the columns and the rows of the plurality of decorative tiles.

14. The decorative composite as defined in claim 11, wherein the first decorative tile is removable from the decorative composite without removing the second decorative tile from the decorative composite.

15. The decorative composite as defined in claim 1, further including the panel, wherein the panel having a honeycomb core and is formed of at least one of a permeable or porous material to enable at least one of vapor or gas to be emitted from the panel.

16. The decorative composite as defined in claim 1, further including a reinforcing layer to dissipate concentrated forces exerted on the first decorative tile by trapped gas or vapor.

17. The decorative composite as defined in claim 1, wherein the adhesive liner has a thickness to partially overlap only a portion of the first decorative tile and the second decorative tile.

18. A method, comprising:
    coupling a decorative composite to a panel of an aircraft, the decorative composite comprising:
        a first decorative tile including a first decorative layer and a first edge;
        a second decorative tile including a second decorative layer and a second edge, the first and second decorative layers composed of an impermeable material that prevents at least one of vapor or gas from escaping at least one of the first decorative tile or the second decorative tile, the first and second decorative layers forming an outer surface of the decorative composite, the second edge adjacent the first edge; and
        an adhesive liner disposed between and contacting the first edge and the second edge to couple the first decorative tile to the second decorative tile, the adhesive liner forming an inner surface of the decorative composite, the inner surface contacting the panel when the decorative composite is coupled to the panel, the adhesive liner is composed of a permeable material configured to vent at least one of gas or vapor away from the first decorative layer and the second decorative layer to deter separation of the first decorative tile and the second decorative tile from the panel when the decorative composite is coupled to the panel.

19. The method as defined in claim 18, further comprising:
   removing the first decorative tile from the decorative composite;
   repairing the removed first decorative tile, or replacing the removed first decorative tile with a replacement decorative tile; and
   coupling the repaired first decorative tile or the replacement decorative tile to the decorative composite.

20. The method as defined in claim 19, wherein the removing of the first decorative tile includes removing the first decorative tile while the second decorative tile remains coupled to the decorative composite, and while the decorative composite remains coupled to the panel.

21. The method as defined in claim 19, further comprising:
   removing a portion of the adhesive liner from the decorative composite;
   repairing the removed portion of the adhesive liner, or replacing the removed portion of the adhesive liner with a replacement portion of the adhesive liner; and
   coupling the repaired portion of adhesive liner or the replacement portion of the adhesive liner to the decorative composite.

\* \* \* \* \*